US012657723B2

(12) United States Patent
Perkins et al.

(10) Patent No.: US 12,657,723 B2
(45) Date of Patent: Jun. 16, 2026

(54) IMAGE CAPTURE FOR OPTICAL VIEWING DEVICES

(71) Applicant: Welch Allyn, Inc., Skaneateles Falls, NY (US)

(72) Inventors: David G Perkins, Tully, NY (US); Danielle R. Endres, Liverpool, NY (US); Lei Guo, Manlius, NY (US); Joshua Hess, Moravia, NY (US); David Villarreal, Fayetteville, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 1 day.

(21) Appl. No.: 18/673,094

(22) Filed: May 23, 2024

(65) Prior Publication Data

US 2024/0404062 A1     Dec. 5, 2024

Related U.S. Application Data

(60) Provisional application No. 63/505,771, filed on Jun. 2, 2023.

(51) Int. Cl.
*G06T 7/38*          (2017.01)
*G06T 7/00*          (2017.01)
*H04N 5/262*        (2006.01)
*H04N 23/62*        (2023.01)
(Continued)

(52) U.S. Cl.
CPC .............. *G06T 7/0016* (2013.01); *G06T 7/38* (2017.01); *H04N 5/2624* (2013.01); *H04N 23/62* (2023.01); *G06T 2207/10016* (2013.01);

*G06T 2207/20212* (2013.01); *G06T 2207/30004* (2013.01); *G06T 2207/30168* (2013.01); *G06T 2207/30204* (2013.01); *H04N 5/91* (2013.01); *H04N 23/51* (2023.01)

(58) Field of Classification Search
None
See application file for complete search history.

(56) References Cited

U.S. PATENT DOCUMENTS

| | | | |
|---|---|---|---|
| 7,325,926 | B2 | 2/2008 | Okinishi |
| 8,262,221 | B2 | 9/2012 | Filar |
| 9,438,773 | B2 | 9/2016 | Howes |

(Continued)

FOREIGN PATENT DOCUMENTS

| | | |
|---|---|---|
| CN | 113397477 A | 9/2021 |
| KR | 100400975 B1 | 9/2003 |

(Continued)

*Primary Examiner* — Eileen M Adams
(74) *Attorney, Agent, or Firm* — Merchant & Gould P.C.

(57)          ABSTRACT

An imaging device for capturing images viewed from an optical viewing device. The imaging device includes a housing having a bracket for attaching the imaging device to the optical viewing device. The imaging device captures a sequence of images viewed from the optical viewing device, determines an image quality score for each image in the sequence of images, and selects a subset of images from the sequence of images based on the image quality score determined for each image in the sequence of images. The imaging device displays the subset of images, receives a selection of one or more images from the subset of images, and stores the one or more images selected from the subset of images.

19 Claims, 13 Drawing Sheets

(51) Int. Cl.
    *H04N 5/91*            (2006.01)
    *H04N 23/51*          (2023.01)

(56)               References Cited

U.S. PATENT DOCUMENTS

| | | | |
|---|---|---|---|
| 11,406,265 B2 | 8/2022 | Dirghangi et al. | |
| 2016/0094801 A1* | 3/2016 | Beysserie | H04N 5/915 |
| | | | 386/226 |
| 2016/0256049 A1 | 9/2016 | Grochowina | |
| 2017/0020389 A1 | 1/2017 | Wang et al. | |
| 2020/0028995 A1 | 1/2020 | Jain | |
| 2021/0233239 A1* | 7/2021 | Li | G16H 30/40 |
| 2021/0274089 A1* | 9/2021 | Wang | G06T 7/0012 |
| 2021/0289189 A1* | 9/2021 | Sela | G06T 3/608 |
| 2022/0047165 A1 | 2/2022 | Perkins et al. | |
| 2022/0104788 A1* | 4/2022 | Ji | A61B 8/06 |
| 2022/0358775 A1* | 11/2022 | Hantehzadeh | G06T 3/18 |
| 2024/0020835 A1* | 1/2024 | Cherubini | G06T 7/73 |

FOREIGN PATENT DOCUMENTS

| | | | |
|---|---|---|---|
| WO | 2017195223 A1 | 11/2017 | |
| WO | 2022265064 A1 | 12/2022 | |

\* cited by examiner

1100

1102 — Capture Sequence of Images

1104 — Determine Image Quality Scores

1106 — Select Subset of Images

1108 — Align, Rotate, and/or Scale

1110 — Apply Filter / Markers

1112 — Display Subset of Images

1114 — Display Baseline Image

1116 — Receive Selection of Image(s)

1118 — Stitch Images

1120 — Synchronize Images

1122 — Store Selected Image(s)

400, 400b

IMAGE CAPTURE FOR OPTICAL VIEWING DEVICES

BACKGROUND

Optical viewing devices are used for examining patients as part of routine examinations. Examples of optical viewing devices can include, without limitation, an otoscope for assessing the ears of a patient, an ophthalmoscope for assessing the eyes of a patient, and a dermatoscope for assessing the skin of a patient.

Capturing an image from an optical viewing device can be difficult. Typically, a user has to press a button to capture an image. Often, this results in movement of the optical viewing device, which can cause blurring in the captured image, and discomfort to the patient. Also, a user must typically remember and/or document what they observe during an examination.

It can also be desirable to view an anatomy with different filters selected on the optical viewing device. However, this typically increases a length of examination since each filter needs to be manually selected on the optical view device. Additionally, some filters, such as contrast enhancing filters, are difficult to implement on optical viewing devices.

SUMMARY

The present disclosure generally relates to image capture for optical view devices. In one possible configuration, an imaging device selects a subset of images from a sequence of images, and stores one or more images selected from the subset of images. Various aspects are described in this disclosure, which include, but are not limited to, the following aspects.

One aspect relates to an imaging device for capturing images viewed from an optical viewing device, the imaging device comprising: a housing having a bracket for attaching the imaging device to the optical viewing device; at least one processing device; and at least one computer-readable data storage device storing software instructions that, when executed by the at least one processing device, cause the at least one processing device to: capture a sequence of images viewed from the optical viewing device; determine an image quality score for each image in the sequence of images; select a subset of images from the sequence of images based on the image quality score determined for each image in the sequence of images; display the subset of images; receive a selection of one or more images from the subset of images; and store the one or more images selected from the subset of images.

Another aspect relates to a method of capturing images from an optical viewing device, the method comprising: capturing a sequence of images viewed from the optical viewing device; determining an image quality score for each image in the sequence of images; selecting a subset of images from the sequence of images based on the image quality score determined for each image in the sequence of images; displaying the subset of images; receiving a selection of one or more images from the subset of images; and storing the one or more images selected from the subset of images.

Another aspect relates to a non-transitory computer-readable media storing data instructions, which when executed by one or more processing devices, cause the one or more processing devices to: capture a sequence of images viewed from the optical viewing device; determine an image quality score for each image in the sequence of images;

select a subset of images from the sequence of images based on the image quality score determined for each image in the sequence of images; present the subset of images on the display screen; receive a selection of one or more images from the subset of images; and store the one or more images selected from the subset of images.

A variety of additional aspects will be set forth in the description that follows. The aspects can relate to individual features and to combination of features. It is to be understood that both the foregoing general description and the following detailed description are exemplary and explanatory only and are not restrictive of the broad inventive concepts upon which the embodiments disclosed herein are based.

DESCRIPTION OF THE FIGURES

The following drawing figures, which form a part of this application, are illustrative of the described technology and are not meant to limit the scope of the disclosure in any manner.

DETAILED DESCRIPTION

Figure 1:
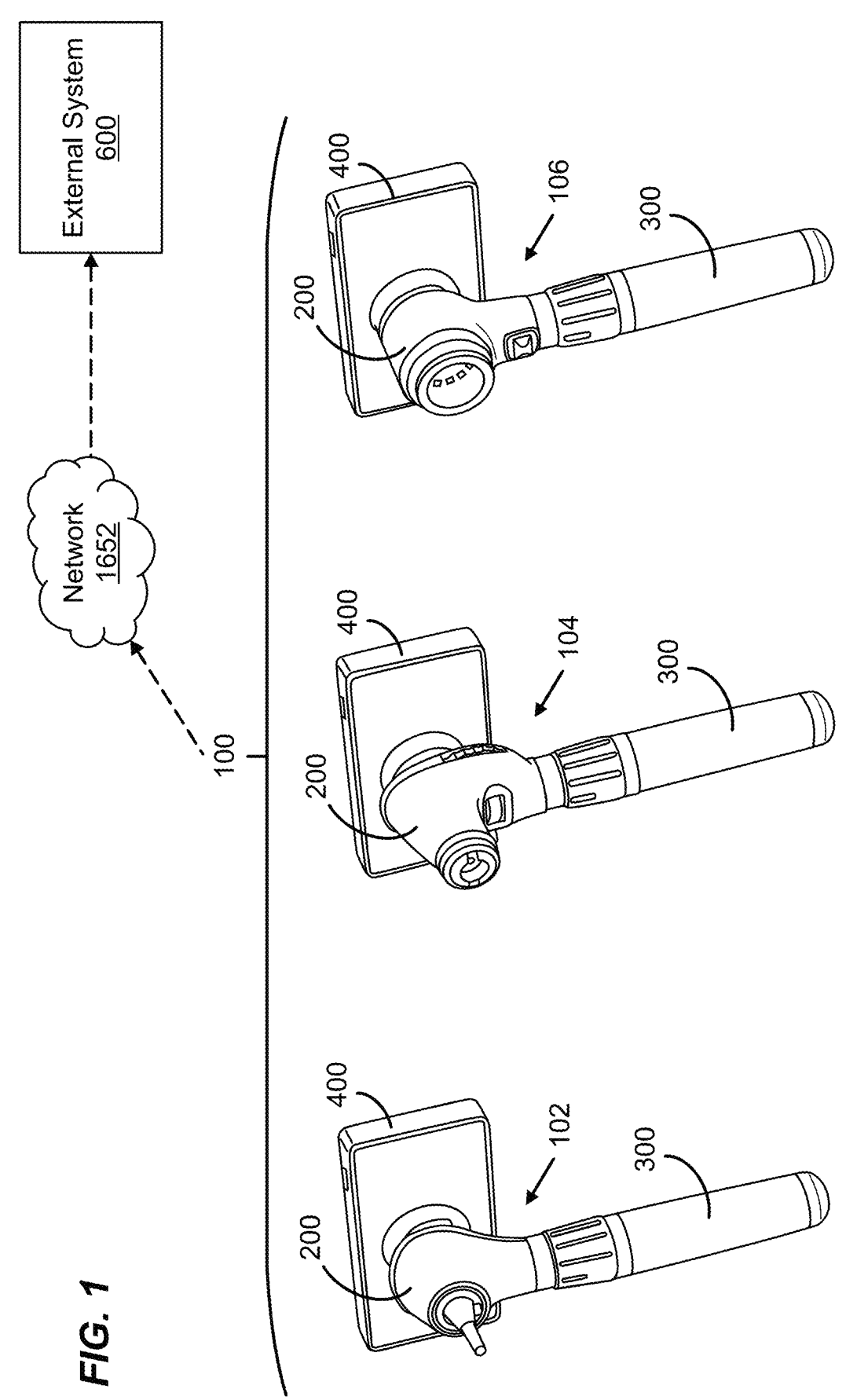
FIG. 1 shows examples of different types of optical viewing devices, each optical viewing device is shown attached to an imaging device.

FIG. 1 shows examples of different types of optical viewing devices 100. For example, the optical viewing devices 100 include a first type of optical viewing device 102 such as an otoscope, a second type of optical viewing device 104 such as an ophthalmoscope, and a third type of optical viewing device 106 such as a dermatoscope. Additional types of the optical viewing devices 100 are contemplated, and the disclosure provided herein is not limited to otoscopes, ophthalmoscopes, and dermatoscopes.

As shown in FIG. 1, each type of optical viewing device 100 includes an instrument head 200 attached to an instrument handle 300. The instrument head 200 can include a light source and optics for viewing an anatomical area of interest through an eyepiece. The instrument handle 300 can include a power source that powers the light source and other components of the instrument head 200. For example, the instrument handle 300 can include rechargeable batteries, disposable batteries, or a tether to a wall transformer for supplying electrical power to the components of the instrument head 200.

As further shown in FIG. 1, an imaging device 400 is attached to the instrument head 200 of each type of optical viewing device 100. The imaging device 400 is a portable, battery powered camera that can record high quality image frames and videos from the optical viewing devices 100, providing digital imaging solutions. For example, the imaging device 400 captures images through an eyepiece of the instrument head 200 for display on a display screen 404 (see FIG. 4) for viewing by a physician. The images captured by the imaging device 400 can be analyzed by algorithms (including artificial intelligence algorithms) for disease screening, and the images can be stored in an electronic medical record (EMR) of a patient.

In some examples, the imaging device 400 transmits images, videos, and other data to an external system 600, which analyzes the images, videos, and other data to generate one or more results for transmission back to the imaging device 400. The external system 600 can be remotely located with respect to the optical viewing device 100 and the imaging device 400. In some examples, the external system 600 includes a cloud server. The imaging device 400 can communicate with the external system 600 via a network 1352 (see also FIG. 13).

The algorithms (including artificial intelligence algorithms) for disease screening can be executed on either or both of the imaging device 400 and the external system 600. In some examples, the external system 600 may also host storage of the images, videos, and other data received from the imaging device 400. In further examples, the external system 600 can host the EMR of the patient. In yet further examples, the external system 600 may provide connectivity to other external systems and servers having image storage, or that host the EMR.

Figure 2:
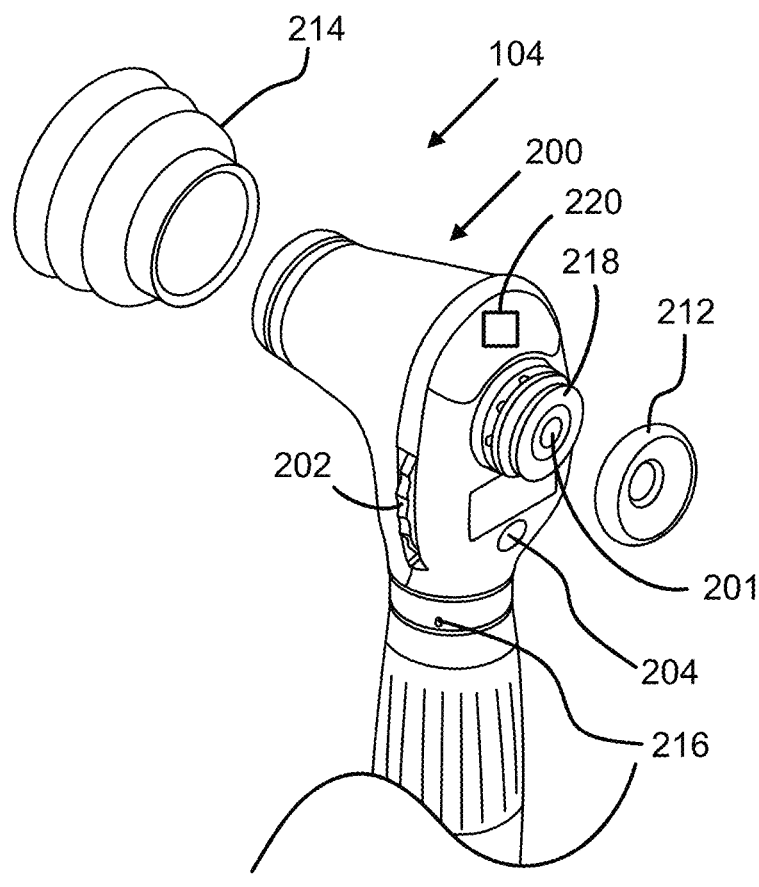
FIG. 2 is an isometric view of an example of an optical viewing device shown in FIG. 1, the optical viewing device shown from a physician perspective.
Figure 3:
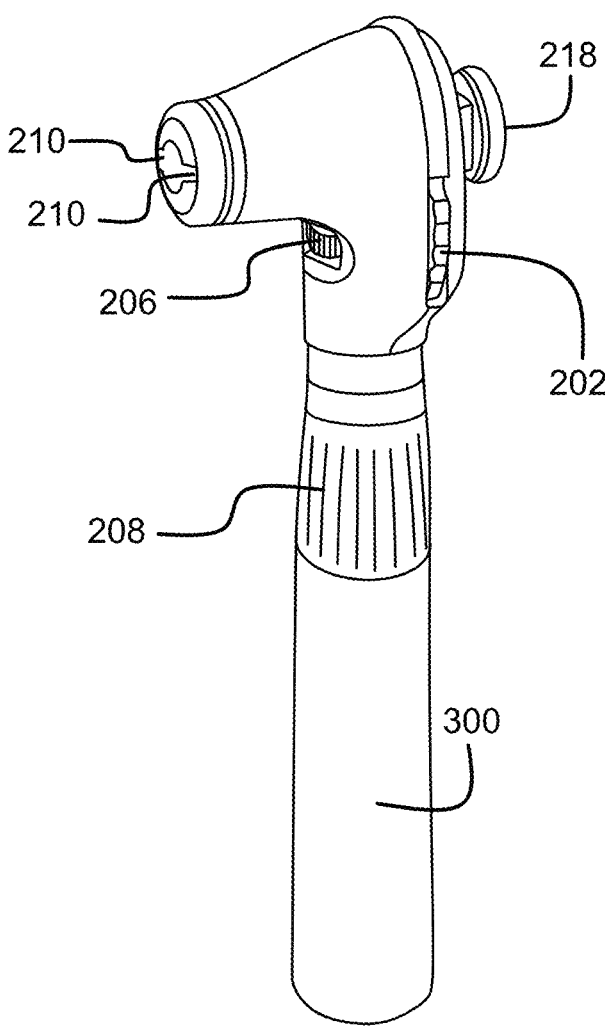
FIG. 3 is another isometric view of the optical viewing device of FIG. 2, the optical viewing device shown from a patient perspective.

FIGS. 2 and 3 are isometric views of an example of the second type of optical viewing device 104 (i.e., ophthalmoscope). In FIG. 2, the second type of optical viewing device 104 is shown from a physician perspective. In FIG. 3, the second type of optical viewing device 104 is shown from a patient perspective. While FIGS. 2 and 3 refer to the second type of optical viewing device 104, the first type of optical viewing device 102 and the third type of optical viewing device 106 can include similar components and features.

Referring now to FIGS. 2 and 3, the second type of optical viewing device 104 includes a diopter focus wheel 202 and a diopter readout 204. The diopter focus wheel 202 can be used to adjust a diopter of an eyepiece 201. For example, the diopter focus wheel 202 can be used to provide a positive dioptric value for the eyepiece 201 to zoom in, and to provide a negative dioptric value for the eyepiece 201 to zoom out.

The dioptric values adjusted by using the diopter focus wheel 202 are displayed in the diopter readout 204. In some examples, positive dioptric values are displayed in the diopter readout 204 in a first color (e.g., green), and negative dioptric values are displayed in the diopter readout 204 in a second color (e.g., red). In some instances, the diopter readout 204 can be obscured by the imaging device 400 when attached to the instrument head 200.

The second type of optical viewing device 104 can further include a filter wheel 206 to select a filter for viewing through the eyepiece 201. For example, the filter wheel 206 can be used to select a polarizing filter to eliminate corneal reflection, a cobalt blue filter to detect corneal abrasions, a red-free filter, and additional types of filters.

The second type of optical viewing device 104 can further include a light control 208 for controlling illumination from the light source, disc alignment lights 210 (e.g., red for right eye exams; yellow for left eye exams), an eyepiece bumper 212, an optional patient eye cup 214, an optional locking collar 216, and an eyepiece housing 218. As will be described in more detail below, the imaging device 400 includes a bracket that removably attaches to the eyepiece housing 218 for securing the imaging device 400 to the instrument head 200.

As further shown in FIG. 2, the second type of optical viewing device 104 can include an identifier 220. While the identifier 220 is described with reference to the second type of optical viewing device 104, the first and third types of optical viewing devices 102, 106, as well as additional types of optical viewing devices can similarly include the identifier 220, as described herein. As will be described in more detail, the identifier 220 provides machine-readable data that can be detected by the imaging device 400 to detect attachment of the imaging device 400 to the instrument head 200, and to convey additional information such as the type of the instrument head 200 (i.e., whether the instrument head 200 is for an otoscope, ophthalmoscope, dermatoscope, or other type of optical viewing device).

In some examples, the identifier 220 is a wireless antenna that transmits a wireless signal that is detected by the imaging device 400 when the imaging device 400 is attached to the instrument head 200. In some examples, the wireless signal transmitted by the identifier 220 to the imaging device 400 can include a radio frequency identification (RFID) signal, a near field communication (NFC) signal, a Bluetooth signal, a Wi-Fi signal, or other similar wireless signals. The identifier 220 can include a passive antenna or tag that is activated by an active antenna on the imaging device 400 to transmit the wireless signal when the imaging device 400 is in close proximity to the instrument head 200 such as when it is attached thereto.

In some further examples, the identifier 220 can provide additional types of machine-readable data that can be detected by the imaging device 400. For example, the identifier 220 can include a quick response (QR) code or other type of machine-readable label that can be read by a primary camera or a secondary camera of the imaging device 400.

Figure 4:
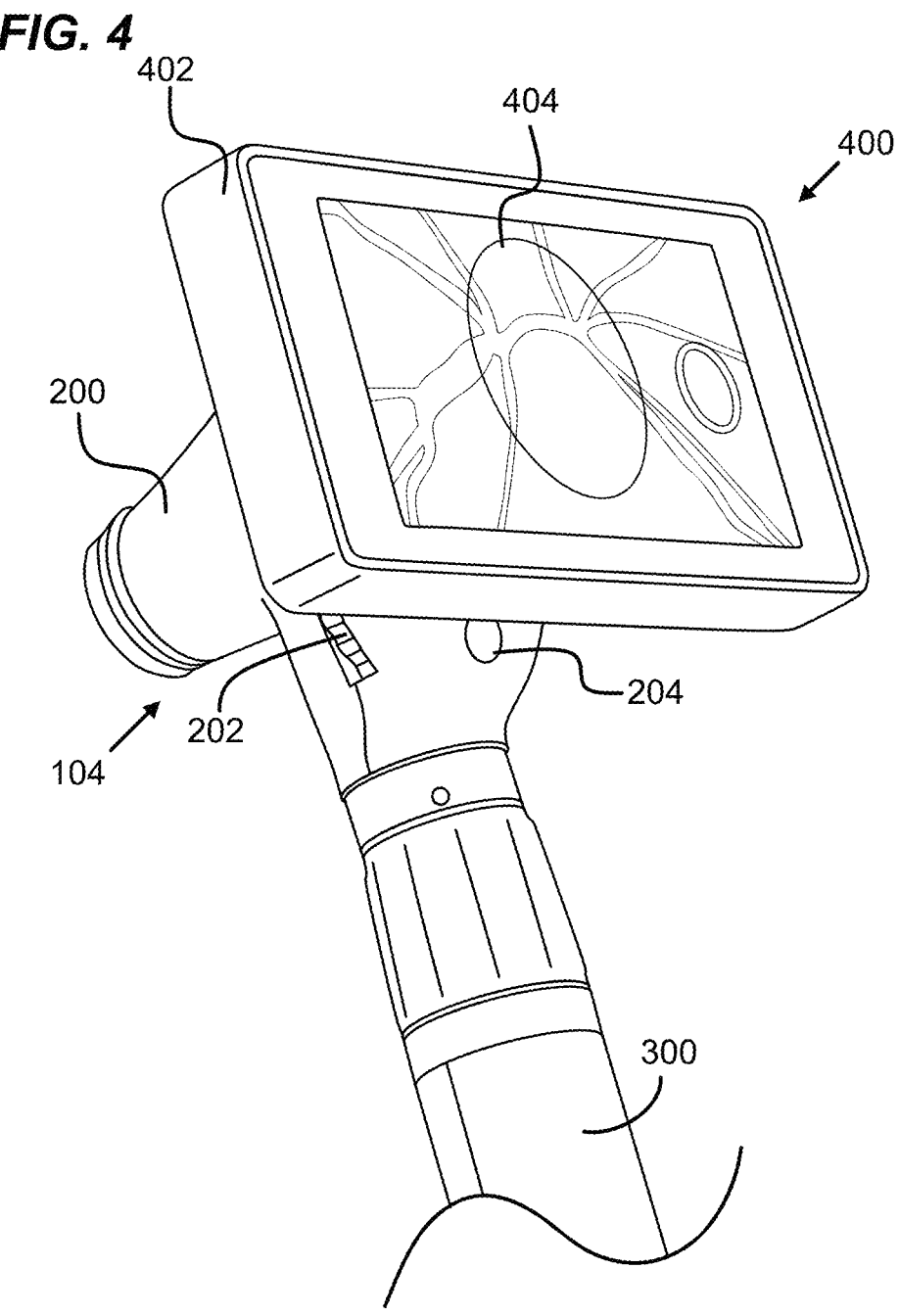
FIG. 4 is an isometric view of an example of the imaging device attached to the optical viewing device of FIG. 2, the imaging device shown from the physician perspective.
Figure 5:
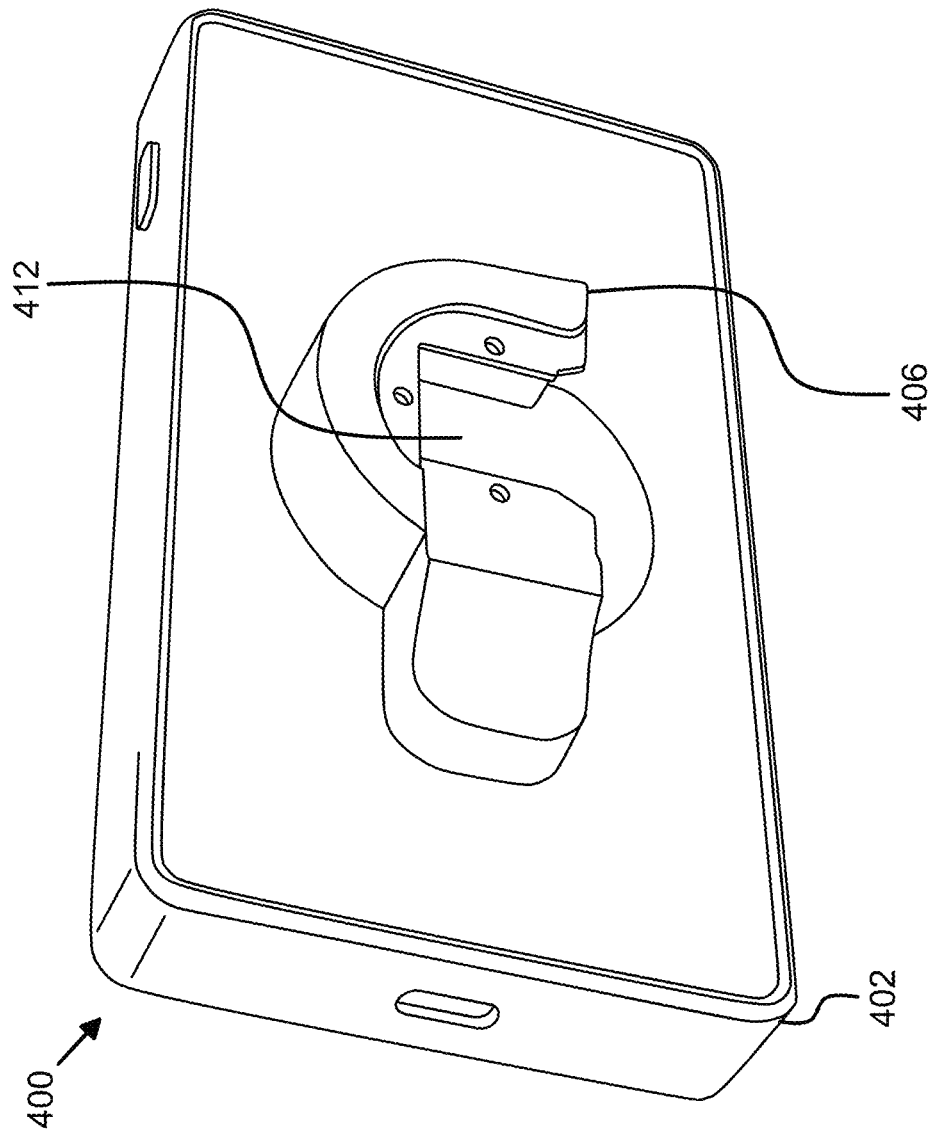
FIG. 5 is a front isometric view of the imaging device of FIG. 4.
Figures 6A, 6B, 6C:
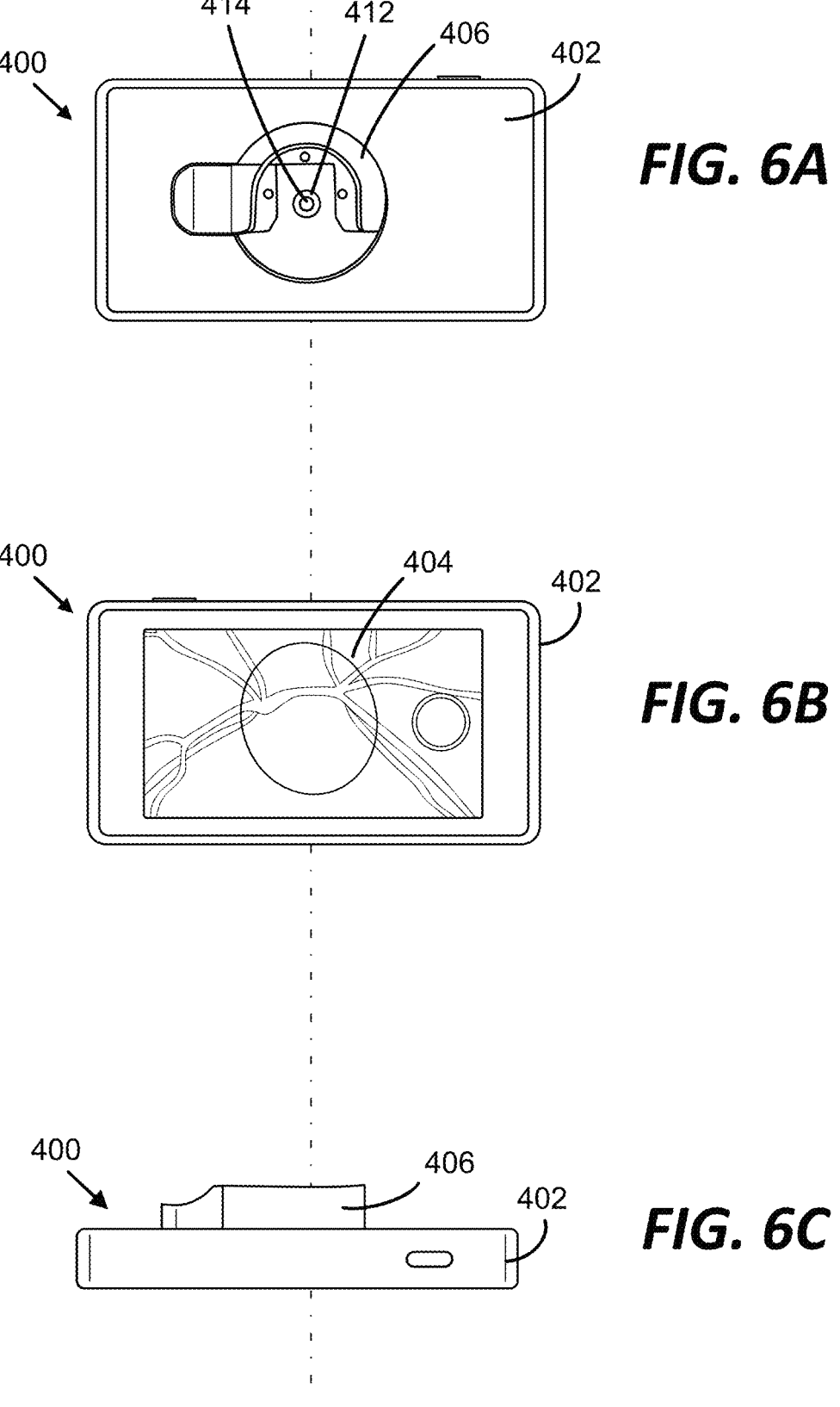
FIG. 6A is a front view of the imaging device of FIG. 4.
FIG. 6B is a rear view of the imaging device of FIG. 4.
FIG. 6C is a top view of the imaging device of FIG. 4.
Figure 7:
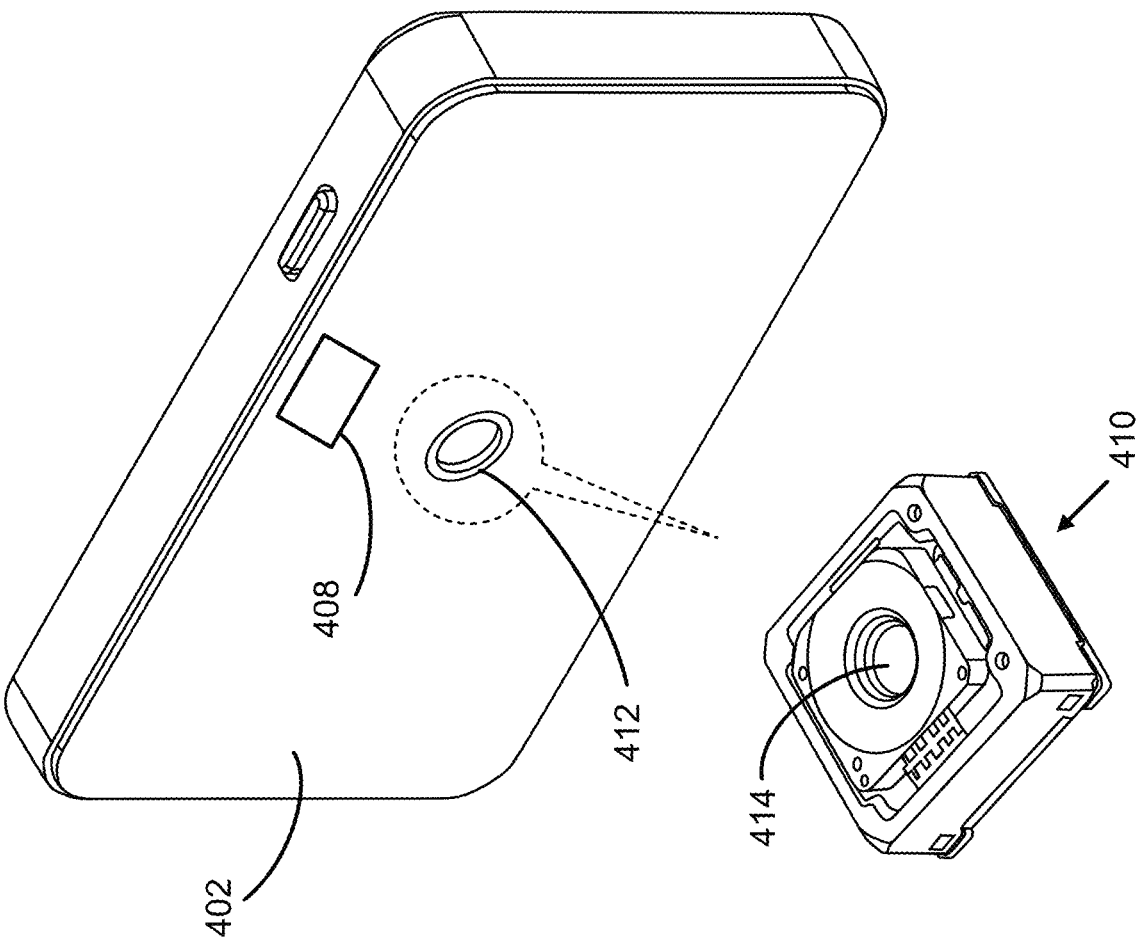
FIG. 7 is an isometric view showing a camera of the imaging device of FIG. 4.

FIG. 4 is an isometric view of an example of the imaging device 400 attached to the second type of optical viewing device 104. In FIG. 4, the imaging device 400 shown from the physician perspective. FIG. 5 is a front isometric view of the imaging device 400. FIG. 6A is a front view of the imaging device 400. FIG. 6B is a rear view of the imaging device 400. FIG. 6C is a top view of the imaging device 400. FIG. 7 is an isometric view showing a camera 410 of the imaging device 400. Referring now to FIGS. 4-7, the imaging device 400 captures images viewed from the eyepiece 201 of an optical viewing device 100. While FIGS. 4-6 show the imaging device 400 attached to the second type of optical viewing device 104, the imaging device 400 can be similarly attached to the first and third types of optical viewing devices 102, 106 for capturing images viewed from the eyepieces 201 of those devices.

As shown in FIGS. 4-6, the imaging device 400 includes a housing 402. In this example, a bracket 406 is integrated with a back surface of the housing 402. The bracket 406 can be used to physically attach the imaging device 400 to the optical viewing devices 100. For example, the bracket 406 can be fixed around an eyepiece housing 218 (see FIGS. 2 and 3) for attaching the imaging device 400 to an instrument head 200. In alternative examples, the bracket 406 can be part of an accessory case that attaches to the housing 402, and that can be used to physically attach the imaging device 400 to the optical viewing devices 100.

As shown in FIG. 7, the housing 402 further includes an aperture 412 for a lens 414 of the camera 410. The camera 410 is mounted inside the housing 402 of the imaging device 400. When the imaging device 400 is mounted to the instrument head 200, the camera 410 is aligned with the eyepiece 201 of the instrument head 200 for capturing images viewed through the eyepiece 201 of the instrument head 200. The camera 410 is centrally mounted inside the housing 402 to provide even balance and weight distribution for when the imaging device 400 is attached to the instrument head 200, thereby improve the ergonomics of the assembly. A protrusion of the lens 414 beyond the back surface of the housing 402 is minimized such that the lens 414 is substantially flush with the back surface of the housing 402.

The camera 410 can include features such as auto focus, auto-exposure, auto white-balance, and image stabilization. The camera 410 can include a 12 MP color image sensor. As an illustrative example, the camera 410 can include an equivalent focal length (on 35 mm film) of 52-77 mm, 4K (30FPS) video recording with 4000×3000 pixel resolution, and a record time of 90 minutes at 4K resolution, 1 minute per clip. Alternative camera parameters are possible.

The housing 402 is compact and lightweight. In some examples, the housing 402 includes a protective overmold having a base layer of plastic material, and a top layer of rubber to provide shock absorption and improved grip. The housing 402 can include one or more ports such as a USB-C port for charging the battery, and for data transferring including uploading images and videos captured by the camera 410 to another device. As an illustrative example, the housing 402 can have a thickness (e.g., distance between the lens 414 of the camera 410 and the display screen 404) that is less than 25 mm, and a weight that is less than 250 g. The housing 402 can include a power button to turn on/off and wake up the imaging device 400. The housing 402 houses an integrated, rechargeable battery that can, for example, power 90 minutes of 4K video recording by the camera 410, and 3-4 hours of screen time on the display screen 404.

As shown in FIG. 7, the imaging device 400 can include a detector 408 that detects the machine-readable data from the identifier 220 on the instrument head 200 (see FIG. 2) to detect attachment of the imaging device 400 to the instrument head 200, and to detect additional information such as the type of the instrument head 200 (i.e., whether the instrument head 200 is for an otoscope, ophthalmoscope, dermatoscope, or other type of optical viewing device).

In some examples, the detector 408 is a wireless antenna that detects a wireless signal from the identifier 220 on the instrument head 200 when the imaging device 400 is attached to the instrument head 200. In some examples, the detector 408 on the imaging device 400 can detect a radio frequency identification (RFID) signal, a near field communication (NFC) signal, a Bluetooth signal, a Wi-Fi signal, or other similar wireless signals emitted from the instrument head 200. The detector 408 can include an active antenna or tag that activates a passive antenna or tag on the instrument head 200 to receive a transmission of the wireless signal. In some examples, the active antenna is mounted on the imaging device 400 in a location that corresponds to the placement of the passive antenna on the instrument head 200 such that the active antenna activates the passive antenna when in close proximity to the passive antenna such as when the imaging device 400 is attached to the instrument head 200.

In some further examples, the detector 408 can include a secondary camera that can read a quick response (QR) code or other type of machine-readable label placed on the instrument head 200. The secondary camera can read the machine-readable label to detect attachment of the imaging device 400 to the instrument head 200, as well as to determine the type of the instrument head 200 (i.e., whether the instrument head 200 is for an otoscope, ophthalmoscope, dermatoscope, or other type of optical viewing device). The secondary camera can be mounted on the imaging device 400 in a location that corresponds to the placement of the machine-readable label on the instrument head 200.

As further shown in FIGS. 4-7, the imaging device 400 includes a display screen 404 for displaying the images captured by the camera 410. In some examples, the display screen 404 is a touchscreen such that it can both display the images, and receive inputs from a user. For example, the display screen 404 can be used by a user of the imaging device to: adjust the settings of the camera 410 (e.g., focus, exposure, white balance, FOV/zoom); tapping the display screen 404 to trigger focus and lock; adjust settings of the display screen 404 such as the screen brightness; provide a virtual keyboard to type in information; display a battery-life indicator; provide video recording controls (e.g., start, stop, save, delete, review, upload; provide a sliding bar to go through video frames, pinch-zoom to enlarge; display arrow (s) to indicate image orientation; and display one or more stamps (e.g., date, time, filter info, etc.) on saved images.

The display screen 404 can include a true color multi-touch screen (in-plane switching (IPS), or light-emitting diode (LED)). The display screen 404 can have a bezel-less design (e.g., full-screen display). The display screen 404 can have a resolution of at least 250 pixels per inch (PPI), a diagonal screen size of about 2 inches to about 5 inches, an aspect ratio of 16:9/4:3, a maximum brightness of 500 nits. The display screen 404 can also include features such as screen auto off, and wake up by power button or tapping the display screen 404.

Figure 8:
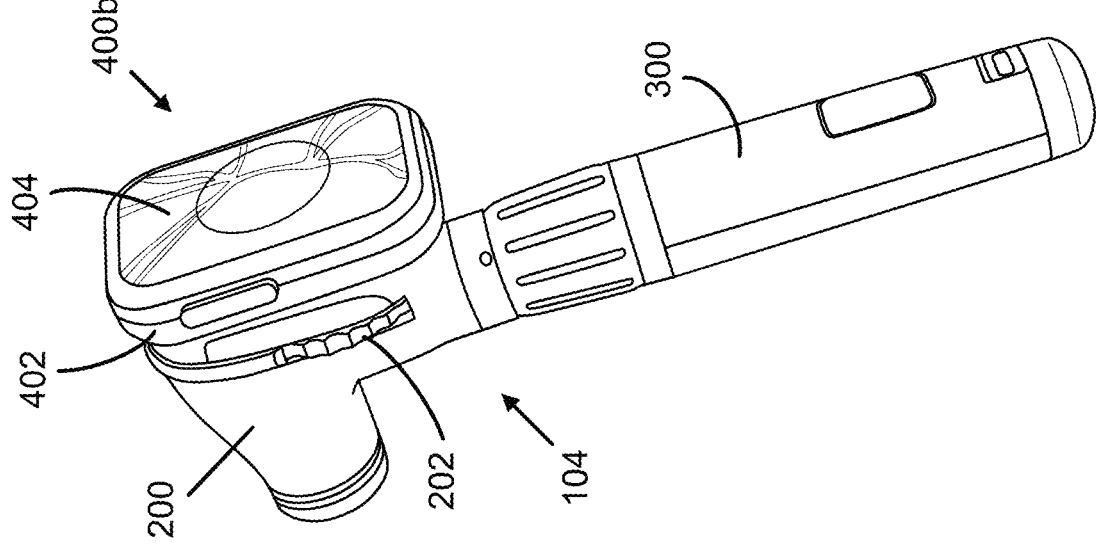
FIG. 8 is an isometric view of another example of the imaging device attached to the optical viewing device of FIG. 2, the imaging device shown from the physician perspective.
Figure 9:
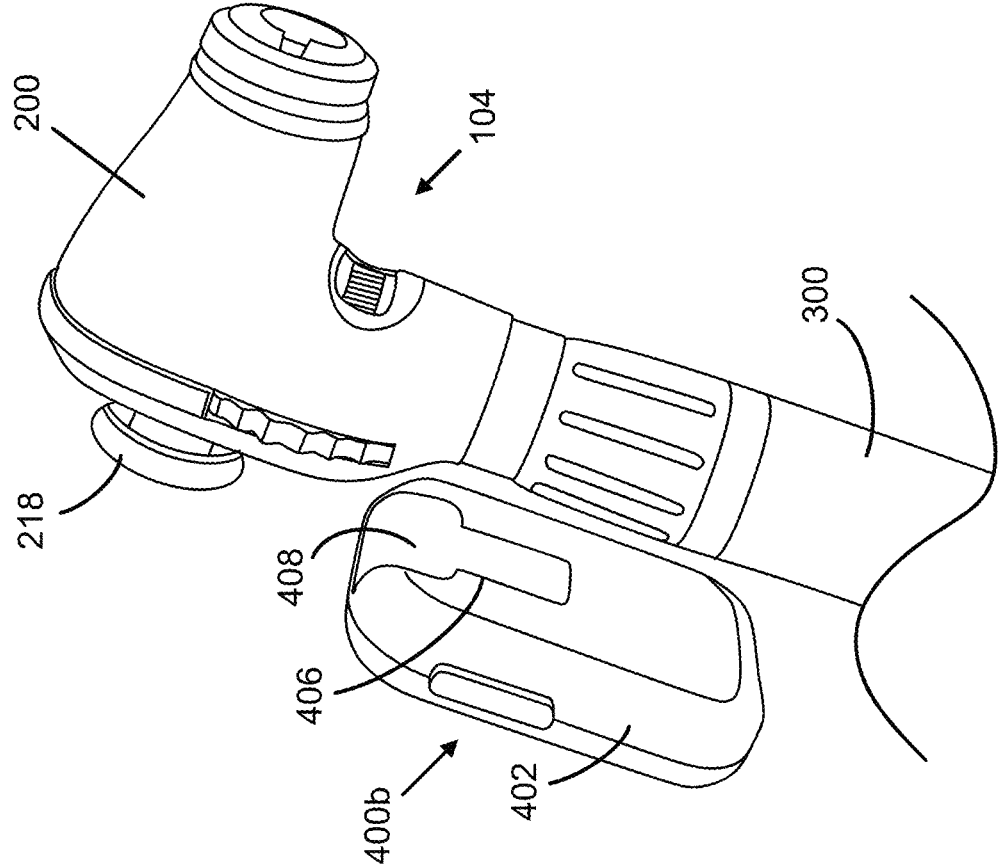
FIG. 9 is an isometric view of the imaging device of FIG. 8 before attachment to the optical viewing device of FIG. 2, the imaging device shown from the patient perspective.

FIG. 8 is an isometric view of another example of an imaging device 400b attached to the second type of optical viewing device 104. In FIG. 8, the imaging device 400b is shown from the physician perspective. FIG. 9 is an isometric view of the imaging device 400b before attachment to the second type of optical viewing device 104. In FIG. 9, the imaging device 400b is shown from the patient perspective. While FIGS. 8 and 9 show the imaging device 400b attached to the second type of optical viewing device 104, the imaging device 400b can similarly attach to the first and third types of optical viewing devices 102, 106, and to additional types of optical viewing devices for capturing and displaying images.

The imaging device 400b is similar to the imaging device 400 shown in FIGS. 4-7. For example, the imaging device 400b includes a housing 402 having a bracket 406 for attaching to the eyepiece housing 218 of the optical viewing device 100. The imaging device 400b similarly includes a display screen 404 for displaying images captured by a camera that is centrally mounted inside the housing 402 of the imaging device 400b to provide even balance and weight distribution. Like in the examples described in FIGS. 4-7, the camera of the imaging device 400b is configured for alignment with the eyepiece 201 of the instrument head 200 for capturing images viewed through the eyepiece 201 of the instrument head 200.

The imaging device 400b can also include a detector 408 for detecting machine-readable data from the instrument head 200 such as to detect attachment of the imaging device 400b to the instrument head 200, and to detect additional information from the instrument head 200 such as the type of the instrument head 200 (i.e., whether the instrument head 200 is for an otoscope, ophthalmoscope, dermatoscope, or other type of optical viewing device).

Figure 10:
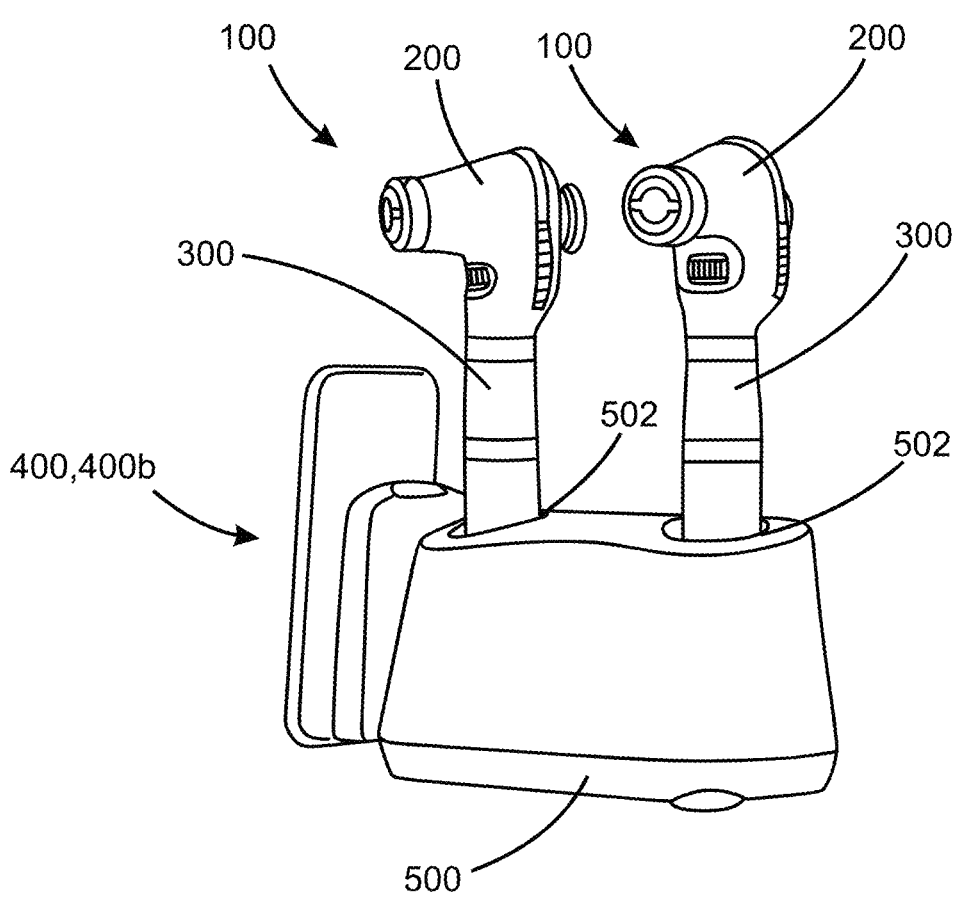
FIG. 10 is an isometric view of a charging station for charging the optical viewing devices of FIG. 1.

FIG. 10 is an isometric view of a charging station 500 for charging the optical viewing devices 100. For example, each instrument handle 300 can be inserted into an aperture 502 of the charging station 500 for charging the power source in the instrument handle 300 when the optical viewing device 100 is not being used. As further shown in FIG. 10, the imaging device 400, 400b can also be held on the charging station 500 for storage and charging.

Figure 11:
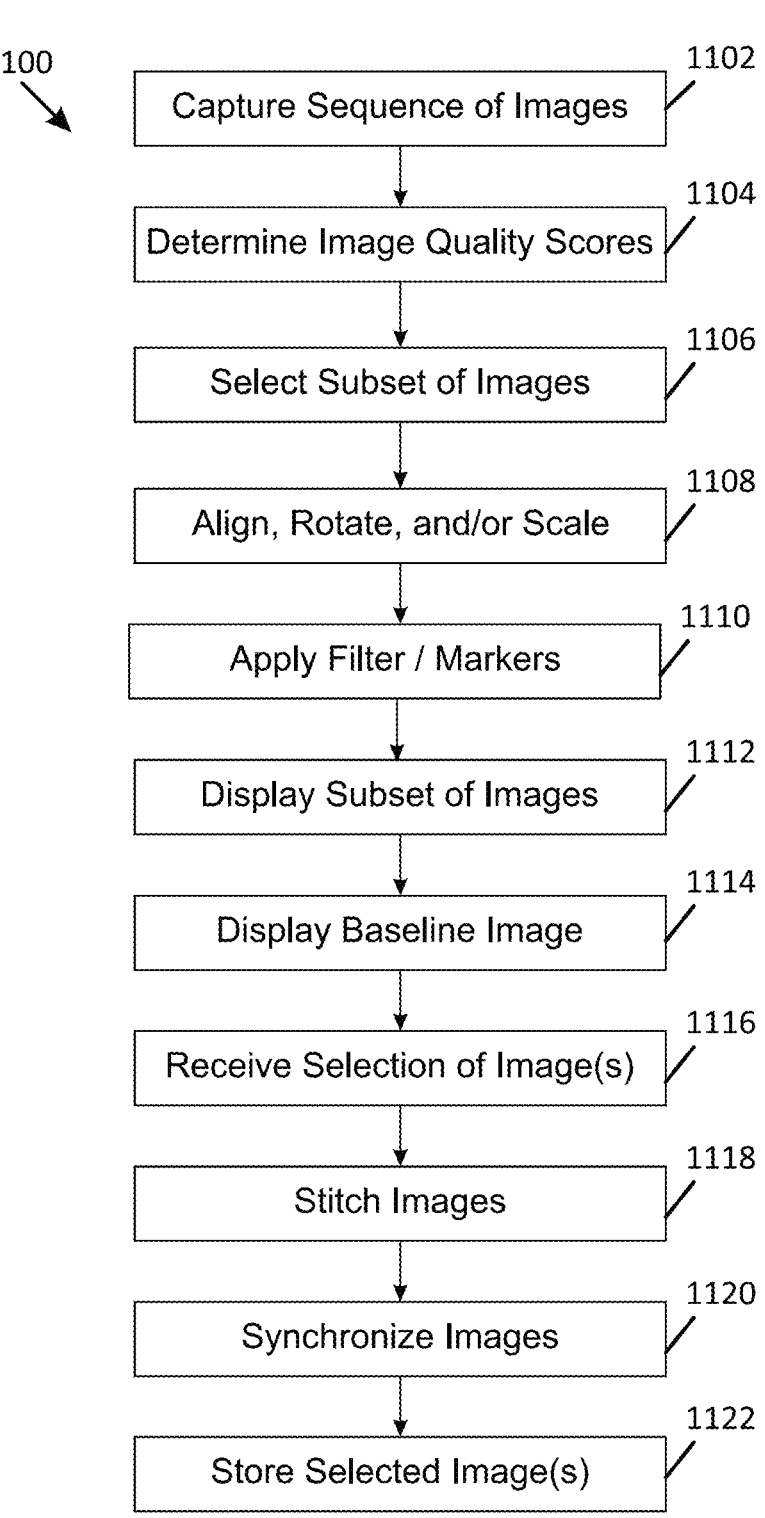
FIG. 11 schematically illustrates an example of a method of capturing images from an optical viewing device of FIG. 1.

FIG. 11 schematically illustrates an example of a method 1100 of capturing images from an optical viewing device 100. For example, the method 1100 can include capturing images from the first type of optical viewing device 102 (e.g., an otoscope), the second type of optical viewing device 104 (e.g., an ophthalmoscope), the third type of optical viewing device 106 (e.g., a dermatoscope), and additional types of optical viewing devices. The method 1100 can be performed on the imaging device 400, 400b for capturing the images using the hardware components of the imaging device 400, 400b, as described in more detail above.

As shown in FIG. 11, the method 1100 includes an operation 1102 of capturing a sequence of images of an anatomical area viewed from the optical viewing device 100. When attached to an otoscope, the anatomical area includes an ear anatomy. When attached to an ophthalmoscope, the anatomical area includes an eye anatomy. When attached to a dermatoscope, the anatomical area includes a skin surface anatomy.

In some instances, the sequence of images captured in operation 1102 includes a video recording of the anatomical area. The video recording can be captured for a predetermined period of time such as 10 seconds, 20 seconds, 30 seconds, and so on. The video recording can include a plurality of images of the anatomical area viewed from the optical viewing device 100.

In some examples, operation 1102 includes capturing the sequence of images based on a voice command. The imaging device 400, 400b can include a microphone 1326 (see FIG. 13), which can be used to detect the voice command. Speech recognition can be implemented on the imaging device 400, 400b to recognize and translate spoken language to initiate image capture upon recognition of the voice command from a user of the imaging device.

The method 1100 further includes an operation 1104 of determining an image quality score for each image in the sequence of images. The image quality score can be calculated using image quality attributes such as resolution, sharpness, contrast, illumination, dynamic range (or exposure range), tone reproduction, color accuracy, exposure accuracy, and other attributes. The image quality score can be calculated based on an absence of visual artifacts such as glare, distortion, noise, vignetting, lateral chromatic aberration (LCA), lens flare, color moiré, and the like. The image quality score can be calculated as a numerical values such as ranging from 0 to 100 (or other similar type of numerical range), where a score of 0 is low quality (i.e., the features and structures within the anatomical area are not visible), and a score of 100 is high quality (i.e., the features and structures within the anatomical area are clearly visible). In some examples, one or more artificial intelligence algorithms can be used to calculate the image quality score.

Next, the method 1100 includes an operation 1106 of selecting a subset of images from the sequence of images (captured in operation 1102) based on the image quality score (determined in operation 1104) for each image in the sequence of images. As an illustrative example, operation 1106 can include selecting a subset of five images that have the highest image quality score. The number of images selected in the subset of images may vary, such that the subset of images may include any number of images greater than or equal to one image.

In some examples, the method 1100 includes an operation 1108 of adjusting an alignment, rotation, and/or scale of the images included in the subset of images. In some examples, operation 1108 can include adjusting at least one of the alignment, rotation, and scale of the images from the subset of images to match an alignment, rotation, and/or scale of a baseline image such as a previously captured image of the anatomical area from the same patient, or a stock image of a healthy condition within the anatomical area.

The optical viewing device 100 is a handheld device such that the images and/or video recordings captured by the imaging device 400, 400b when attached to the optical viewing device 100 will vary in alignment, rotation, and scale based on the hand movements of the user, such that capturing the images and/or video recordings to have the same alignment, rotation, and scale for each use of the imaging device 400, 400b is humanely impossible. Advantageously, adjusting the alignment, rotation, and/or scale of the images from the subset of images facilitates comparison to a baseline image because the images from the subset of images and the baseline image will have the same alignment, rotation, and scale for easier comparison.

In some examples, operation 1108 can include vertically aligning an orientation of each image in the subset of images, which can help provide a consistent orientation for comparison with the one or more baseline images. In some examples, operation 1108 can include using at least one structure or feature within the anatomical area to adjust the alignment, rotation, and/or scale of the at least one image from the subset of images. For example, blood vessels can be used to adjust the alignment, rotation, and/or scale of the at least one image from the subset of images to match the alignment, rotation, and/or scale of one or more baseline images since the size, positioning, and shape of blood vessels typically remain unchanged exam to exam. Additional types of anatomical structures and features can be used to adjust the alignment, rotation, and/or scale of the at least one image from the subset of images.

In some examples, the method 1100 includes an operation 1110 of applying a digital filter to at least one image from the subset of images. For example, a red-free filter can help highlight features of anatomy that have blood such as blood vessels and wounds. In some examples, operation 1110 includes applying a cobalt blue filter to detect corneal abrasions, such as when the imaging device 400, 400b is attached to an ophthalmoscope. An enhanced contrast filter can also be applied to enhance the contrast between the structures and features shown in the anatomical area. Additional types of filters can also be applied after image capture.

In some examples, operation 1110 can include adding one or more markers to at least one image from the subset of images. For example, a marker can identify a structure in the anatomical area such as a hole in the tympanic membrane (i.e., eardrum). As another example, a marker can highlight an optic disc of the eye. In further examples, the marker can include a measurement of a structure in the anatomical area such as an optic disc diameter, or size of the malleus of the cardrum. Additional examples of how one or more markers can be used to identify structures in the anatomical area are possible. In some examples, one or more artificial intelligence algorithms can be used to identify the structures in the anatomical area and/or for measuring such structures. The markers are nondestructive such that the markers can be removed from the image without deleting or altering the image. In some examples, the markers can be turned on and turned off using one or more controls on the display screen 404.

Figure 12:
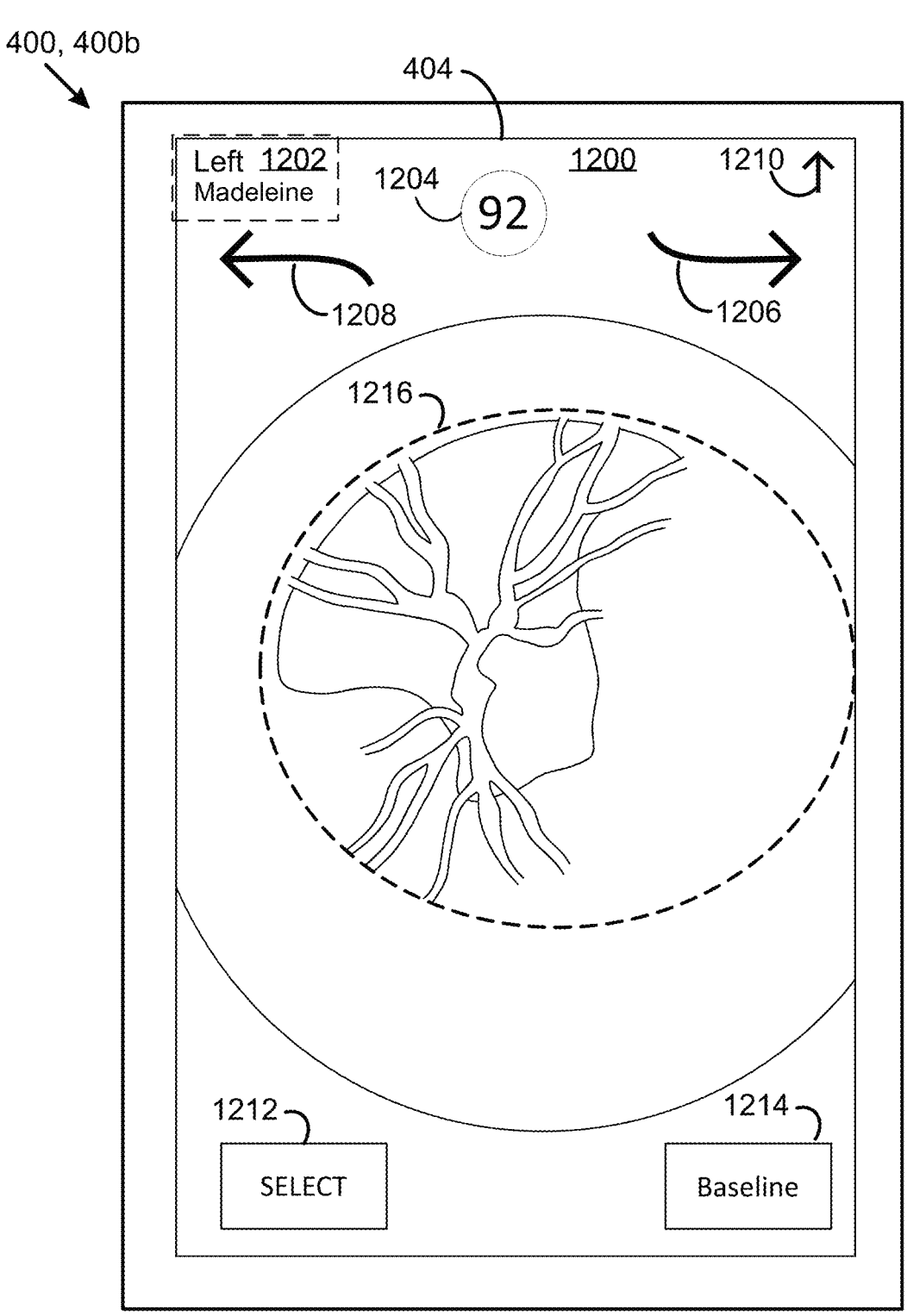
FIG. 12 shows an example of an image displayed on a display screen of the imaging device in accordance with the method of FIG. 11.

Next, the method 1100 includes an operation 1112 of displaying the subset of images on the display screen 404. FIG. 12 shows an example of an image 1200 displayed on the display screen 404 of the imaging device 400, 400*b* in accordance with operation 1112 of the method 1100. In this illustrative example, the image 1200 includes an image quality score 1204 (e.g., "92"). The image quality score 1204 provides instant recognition of whether the image 1200 is a high-quality image or a low-quality image that the user can compare to the other images in the subset of images. In this illustrative example, the image quality score 1204 is "92" such that it is a high quality of image within a range of 0 to 100, where a score of 0 is low quality (i.e., the features and structures within the anatomical area are not visible), and a score of 100 is high quality (i.e., the features and structures within the anatomical area are clearly visible).

The image 1200 can include one or more operators 1206, 1208 that are selectable to switch to another image of the subset of images. For example, the user can select the one or more operators 1206, 1208 to view another image in the subset of images that may have an even higher image quality score, or that may have a lower image quality score but includes more relevant structures or features. In further examples, the user can touch anywhere on the image 1200 to transition to another image of the subset of images.

In FIG. 12, the image 1200 further includes an orientation marker 1210 that can indicate an orientation of the anatomical area within the image 1200 such as whether the anatomical area is vertically up or down, or horizontally left or right. The image 1200 can further include identity information 1202 such as whether the image 1200 is of the left eye or the right eye, and an identity of the patient such as their name, date of birth, and the like. In this example, the image 1200 further includes a marker 1216 identifying an optic disc in the anatomical area.

In some examples, the method 1100 includes an operation 1114 of displaying a baseline image for comparison to one or more images from the subset of images. The baseline image can include a previously captured image of the anatomical area such that comparison to one or more images from the subset of images shows a progression of a condition within the anatomical area. Alternatively, the baseline image can include an example image of a healthy condition within the anatomical area. Additional examples for the baseline image are possible.

A user of the imaging device 400, 400*b* can compare the baseline image to the one or more images from the subset of images by using one or more controls on the display screen 404. For example, the user can select the one or more operators 1206, 1208 to transition on the display screen 404 between a display of the baseline image and a display of the at least one image from the subset of images. In further examples, the user can touch anywhere on the image 1200 to transition back and forth between the baseline image and the one or more images from the subset of images. Alternatively, the display of the baseline image and the at least one image from the subset of images can automatically transition such as from a flicker.

Instead of displaying the baseline image and the one or more images from the subset of images side-by-side, the display screen 404 transitions from displaying one image to another, which can provide a more useful comparison to highlight subtle changes in anatomy from the baseline image given the limited size of the display screen 404. As an illustrative example, a baseline image can include an image taken when the patient is initially diagnosed with an car infection, and the one or more images from the subset of images can include images taken from a subsequent screening such that when compared to the baseline image, can help to show whether inflammation of the car has decreased for determining whether the ear infection is cured or not.

Referring back to FIG. 11, the method 1100 further includes an operation 1116 of receiving a selection of one or more images from the subset of images. In the example shown in FIG. 12, the selection of the one or more images from the subset of images is received via a selection of an icon 1212 on the image 1200. In some examples, operation 1116 can include receiving a selection of a single image from the subset of images. Alternatively, operation 1116 can include receiving more than one image from the subset of images.

The method 1100 allows the user of the imaging device 400, 400*b* to select the one or more images from the subset of images, instead of automatically selecting an image based on the image quality score. This can be advantageous because in some instances, images may have a lower image quality score, but can include more relevant structures or features such that these images are more desirable than images having a higher image quality score.

In some examples, operation 1116 includes receiving a selection of an image from the subset of images for use as a baseline image for future screenings. For example, the image selection can include a label that identifies the selected image as a baseline image. In the example shown in FIG. 12, the label for identifying the selected image as a baseline image can be applied via a selection of an icon 1214 on the image 1200.

The method 1100 can include an operation 1118 of stitching together two or more images of the sequence of images to generate a panoramic image of the anatomical area. For example, operation 1118 can include stitching together two or more of images of the sequence of images to generate a panoramic image of the ear (e.g., when the imaging device 400 is attached to an otoscope). Also, operation 1118 can include stitching together two or more images of the sequence of images to generate a panoramic image of the eye (e.g., when the imaging device 400 is attached to an ophthalmoscope). As yet another example, operation 1118 can include stitching together two or more images of the sequence of images to generate a panoramic image of a skin surface (e.g., when the imaging device 400 is attached to a dermatoscope).

In further examples, operation 118 can include stitching together two or more sections of two or more images in the sequence of images based on a quality score determined for each section such as to generate a composite image having a higher clarity than any of the individual images within the sequence of images. The quality score determined for each section of the images can be based on one or more of a resolution, a focus, and an illumination.

The method 1100 can include an operation 1120 of synchronizing the sequence of images to a stimulus applied by the optical viewing device 100. For example, when the optical viewing device 100 is an otoscope equipped with an insufflation bulb, operation 1120 can include synchronizing the sequence of images to a pressure applied by the insufflation bulb. This allows determination of a mobility of the tympanic membrane (i.e., cardrum) in response to pressure changes. A healthy tympanic membrane moves in response to pressure. Immobility of the tympanic membrane may be due to fluid in the middle car, a perforation, or tympanosclerosis, among other reasons. The insufflation bulb can measure pressure, and communicate the pressure measurement to the imaging device 400, 400b via a wireless or wired connection. Alternatively, the insufflation bulb can transmit the pressure to the imaging device 400, 400b such that the imaging device measures the pressure.

As another example, when the optical viewing device 100 is an ophthalmoscope, operation 1120 can include synchronizing the sequence of images to a light stimulus applied by a light source on an instrument head of the ophthalmoscope. By synchronizing the sequence of images to the light stimulus, a pupillary response to the light stimulus can be measured.

As shown in FIG. 11, the method 1100 includes an operation 1122 of storing the one or more images selected from the subset of images. In some examples, operation 1122 can include storing a video recording of the anatomical area in addition to the one or more images selected from the subset of images. The video recording can show important details that are not visible in static images such as tympanic membrane movement during pneumatic otoscopy (i.e., when the imaging device 400, 400b is attached to an otoscope), and spontaneous venal pulsations in eye exams (i.e., when the imaging device 400, 400b is attached to an ophthalmoscope).

In some examples, operation 1122 can include storing at least one image from the subset of images with a digital filter applied thereto. As described above, examples of digital filters can include a red-free filter, a cobalt blue filter, and other types of filters.

In some examples, operation 1122 can include storing at least one image from the subset of images with a marker applied thereto. As described above, the marker can be used to identify a structure or feature in the anatomical area, and can in some further examples, provide a measurement of the structure or feature identified in the anatomical area.

In some examples, operation 1122 includes storing the one or more images and/or video recording locally on the imaging device 400, 400b such as in a system memory 1304 or secondary storage device 1314 (see FIG. 13) of the imaging device. Alternatively, or in addition to storing the one or more images and/or video recording locally on the imaging device 400, 400b, operation 1122 can further include storing the one or more images and/or video recording externally such as on the external system 600. As described above, the external system 600 can include a cloud server that can analyze the one or more images and/or video recording to generate one or more results for transmission back to the imaging device 400, 400b. In further examples, the external system 600 can host the EMR of the patient.

Figure 13:
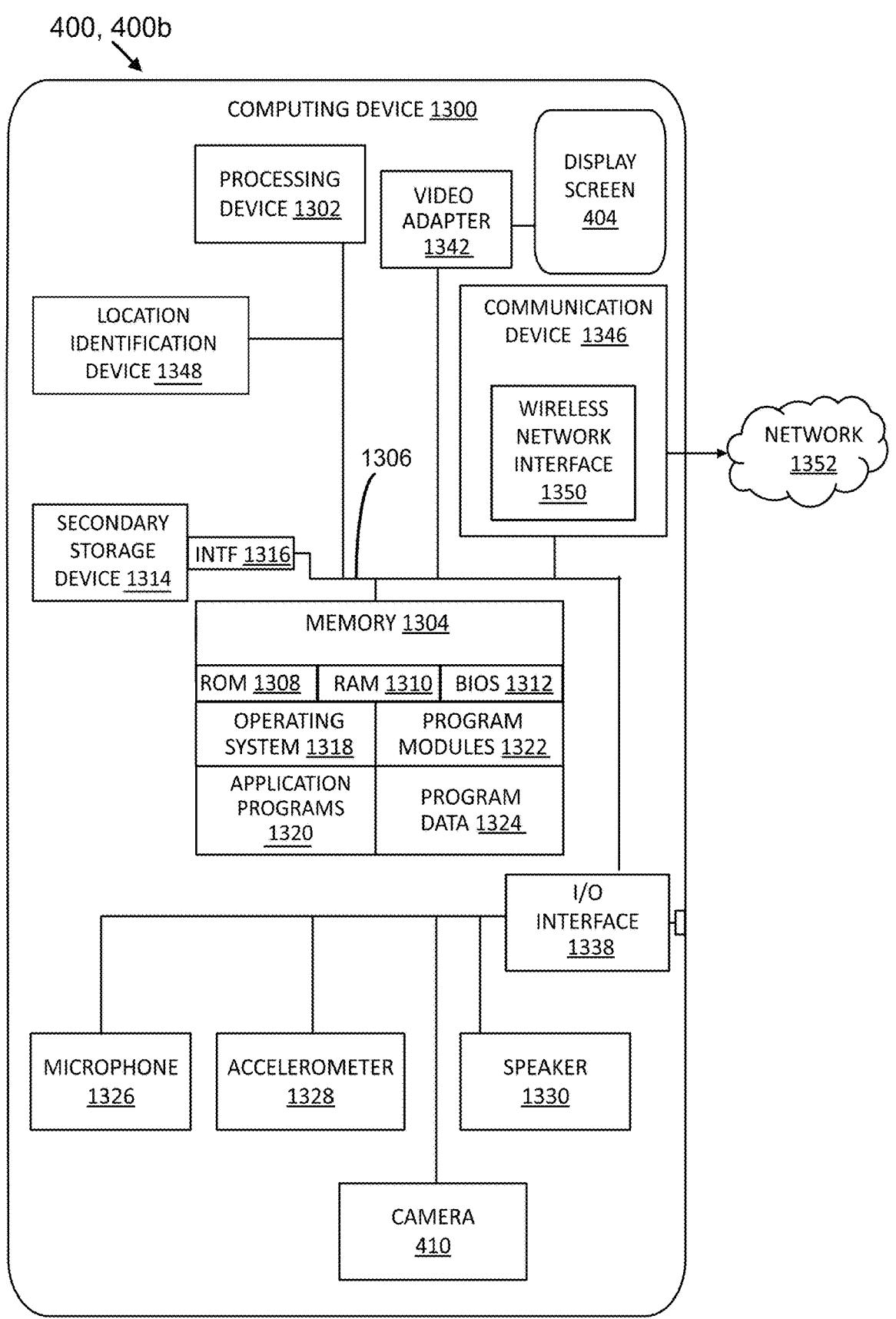
FIG. 13 illustrates an exemplary architecture of a computing device of the imaging device shown in any of the above figures.

FIG. 13 illustrates an exemplary architecture of a computing device 1300 of the imaging device 400, 400b. The computing device 1300 is used to execute the functionality of the imaging device 400 described herein. The imaging device 400, 400b can include all or some of the elements described with reference to FIG. 13, with or without additional elements.

The computing device 1300 includes at least one processing device 1302. Examples of the at least one processing device 1302 can include, without limitation, central processing units (CPUs), digital signal processors, field-programmable gate arrays, and other types of electronic computing circuits. The at least one processing device 1302 can include a processing circuitry having a memory for storing instructions which, when executed by the processing circuitry, cause the processing circuitry to perform the functionalities described herein.

The computing device 1300 also includes a system memory 1304, and a system bus 1306 that couples various system components including the system memory 1304 to the at least one processing device 1302. The system bus 1306 can include any type of bus structure including a memory bus, or memory controller, a peripheral bus, and a local bus.

The system memory 1304 may include read only memory (ROM) 1308 and a random-access memory (RAM) 1310. An input/output system containing routines to transfer information within the computing device 1300, such as during start up, can be stored in the read only memory (ROM) 1308. The system memory 1304 can be housed inside the housing 402.

The computing device 1300 can further include a secondary storage device 1314 for storing digital data. The secondary storage device 1314 is connected to the system bus 1306 by a secondary storage interface 1316. The secondary storage devices and their computer-readable media provide nonvolatile storage of computer-readable instructions (including application programs and program devices), data structures, and other data for the computing device 1300.

A number of program devices can be stored in secondary storage device 1314 or the system memory 1304, including an operating system 1318, one or more application programs 1320, other program devices 1322, and program data 1324. The system memory 1304 and the secondary storage device 1314 are examples of computer-readable data storage devices.

The computing device 1300 can include one or more input devices such as the display screen 404 (in examples where the display screen 404 is a touch sensitive touchscreen), one or more physical push buttons on the housing 402 of the imaging device 400, and the camera 410. Additional examples of input devices include a microphone 1326, and an accelerometer 1328 for image orientation on the display screen 404. The computing device 1300 can also include output devices such as the display screen 404, and a speaker 1330.

The input and output devices are connected to the at least one processing device 1302 through an input/output interface 1338 coupled to the system bus 1306. The input and output devices can be connected by any number of input/output interfaces, such as a parallel port, serial port, game port, or a universal serial bus. Wireless communication between the input and output devices and the input/output interface 1338 is possible as well, and can include Wi-Fi, Bluetooth, infrared, 802.11a/b/g/n, cellular, or other wireless communications.

In some examples, the display screen 404 is touch sensitive and is connected to the system bus 1306 via an interface, such as a video adapter 1342. The display screen 404 includes touch sensors for receiving input from a user when the user touches the display. Such sensors can be capacitive sensors, pressure sensors, or other touch sensors. The sensors detect contact with the display, and also the location and movement of the contact over time. For example, a user can move a finger or stylus across the display screen 404 to provide inputs.

The computing device 1300 further includes a communication device 1346 configured to establish communication across a network 1352. In some examples, when used in a local area networking environment or a wide area networking environment (such as the Internet), the computing device 1300 is typically connected to the network 1352 through a network interface, such as a wireless network interface 1350. The wireless network interface 1350 can provide Wi-Fi functionality such as for image and video transferring, live streaming, and providing a mobile hotspot. In some further examples, the wireless network interface 1350 can provide Bluetooth connectivity. Other possible examples using other wired and/or wireless communications are possible. For example, the computing device 1300 can include an Ethernet network interface, or a modem for communicating across the network.

In further examples, the communication device 1346 provides short-range wireless communication. The short-range wireless communication can include one-way or two-way short-range to medium-range wireless communication. Short-range wireless communication can be established according to various technologies and protocols. Examples of short-range wireless communication include a radio frequency identification (RFID), a near field communication (NFC), a Bluetooth technology, a Wi-Fi technology, or similar wireless technologies.

The computing device 1300 typically includes at least some form of computer-readable media. Computer-readable media includes any available media that can be accessed by the computing device 1300. By way of example, computer-readable media is non-transitory and can include computer-readable storage media and computer-readable communication media.

Computer-readable storage media includes volatile and nonvolatile, removable, and non-removable media implemented in any device configured to store information such as computer-readable instructions, data structures, program devices, or other data. Computer-readable storage media includes, but is not limited to, random access memory, read only memory, electrically erasable programmable read only memory, flash memory or other memory technology, or any other medium that can be used to store the desired information and that can be accessed by the computing device 1300.

Computer-readable communication media embodies computer-readable instructions, data structures, program devices or other data in a modulated data signal such as a carrier wave or other transport mechanism and includes any information delivery media. Modulated data signal refers to a signal having one or more of its characteristics set or changed in such a manner as to encode information in the signal. By way of example, computer-readable communication media includes wired media such as a wired network or direct-wired connection, and wireless media such as acoustic, radio frequency, infrared, and other wireless media. Combinations of any of the above are also included within the scope of computer-readable media.

The computing device 1300 is an example of programmable electronics, which may include one or more computing devices, and when multiple computing devices are included, such computing devices can be coupled together with a suitable data communication network so as to collectively perform the various functions, methods, or operations disclosed herein.

The computing device 1300 can include a location identification device 1348. The location identification device 1348 is configured to identify the location or geolocation of the computing device 1300. The location identification device 1348 can use various types of geolocating or positioning systems, such as network-based systems, handset-based systems, SIM-based systems, Wi-Fi positioning systems, and hybrid positioning systems. Network-based systems utilize service provider's network infrastructure, such as cell tower triangulation. Handset-based systems typically use the Global Positioning System (GPS). Wi-Fi positioning systems can be used when GPS is inadequate due to various causes including multipath and signal blockage indoors. Hybrid positioning systems use a combination of network-based and handset-based technologies for location determination, such as Assisted GPS.

The various embodiments described above are provided by way of illustration only and should not be construed to be limiting in any way. Various modifications can be made to the embodiments described above without departing from the true spirit and scope of the disclosure.

What is claimed is:

1. An imaging device for capturing images viewed from an optical viewing device, the imaging device comprising:
   a housing having a bracket for attaching the imaging device to the optical viewing device;
   at least one processing device; and
   at least one computer-readable data storage device storing software instructions that, when executed by the at least one processing device, cause the at least one processing device to:
      capture a sequence of images viewed from the optical viewing device;
      determine an image quality score for each image in the sequence of images;
      select a subset of images from the sequence of images based on the image quality score determined for each image in the sequence of images;
      display the subset of images;
      receive a selection of one or more images from the subset of images;
      display a comparison of a baseline image to the one or more images selected from the subset of images, wherein the baseline image is a previously captured image of an anatomical area illustrating a progression of a condition within the anatomical area; and
      store the one or more images selected from the subset of images.

2. The imaging device of claim 1, wherein the instructions, when executed by the at least one processing device, further cause the at least one processing device to:
   store a video recording of an anatomical area.

3. The imaging device of claim 1, wherein the instructions, when executed by the at least one processing device, further cause the to:

transition between a display of the baseline image and a display of the one or more images selected from the subset of images.

4. The imaging device of claim 1, wherein the instructions, when executed by the at least one processing device, further cause the at least one processing device to:
adjust at least one of an alignment, a rotation, and a scale of the one or more images selected from the subset of images to match an alignment, a rotation, and a scale of the baseline image.

5. The imaging device of claim 4, wherein the instructions, when executed by the at least one processing device, further cause the at least one processing device to:
use at least one structure within an anatomical area to adjust the at least one of the alignment, the rotation, and the scale of the one or more images selected from the subset of images.

6. The imaging device of claim 1, wherein the instructions, when executed by the at least one processing device, further cause the at least one processing device to:
apply a digital filter to the one or more images selected from the subset of images; and
store the one or more images with the digital filter applied thereto.

7. The imaging device of claim 1, wherein the instructions, when executed by the at least one processing device, further cause the at least one processing device to:
add a marker to the one or more images selected from the subset of images, the marker identifying a feature in an anatomical area.

8. The imaging device of claim 1, wherein the instructions, when executed by the at least one processing device, further cause the at least one processing device to:
receive a voice command; and
capture the sequence of images based on the voice command.

9. The imaging device of claim 1, wherein the instructions, when executed by the at least one processing device, further cause the at least one processing device to:
stitch together the one or more images selected from the subset of images to generate a panoramic image of an anatomical area.

10. The imaging device of claim 1, wherein the instructions, when executed by the at least one processing device, further cause the at least one processing device to:
select sections of the one or more images selected from the subset of images based on one or more of a resolution, a focus, and an illumination; and
stitch together the selected sections to generate a composite image.

11. The imaging device of claim 1, wherein the instructions, when executed by the at least one processing device, further cause the at least one processing device to:
synchronize the sequence of images to a stimulus applied by the optical viewing device.

12. A method of capturing images from an optical viewing device, the method comprising:
capturing a sequence of images viewed from the optical viewing device;
determining a quality score for sections of each image in the sequence of images;
stitching together two or more sections of two or more images in the sequence of images based on the quality score;
determining an image quality score for each image in the sequence of images;

selecting a subset of images from the sequence of images based on the image quality score determined for each image in the sequence of images;
displaying the subset of images;
receiving a selection of one or more images from the subset of images; and
storing the one or more images selected from the subset of images.

13. The method of claim 12, further comprising:
storing a video recording of an anatomical area.

14. The method of claim 12, further comprising:
receiving a voice command; and
capturing the sequence of images based on the voice command.

15. The method of claim 12, further comprising:
stitching together the sequence of images to generate a panoramic image.

16. A non-transitory computer-readable media storing data instructions, which when executed by one or more processing devices, cause the one or more processing devices to:
capture a sequence of images viewed from an optical viewing device;
determine an image quality score for each image in the sequence of images;
select a subset of images from the sequence of images based on the image quality score determined for each image in the sequence of images;
present the subset of images on the display screen;
receive a selection of one or more images from the subset of images;
store the one or more images selected from the subset of images;
display a comparison of a baseline image to the one or more images selected from the subset of images; and
transition between a display of the baseline image and a display of the one or more images selected from the subset of images.

17. The non-transitory computer-readable media of claim 16, wherein the baseline image is an example of a healthy condition within an anatomical area.

18. An imaging device for capturing images viewed from an optical viewing device, the imaging device comprising:
a housing having a bracket for attaching the imaging device to the optical viewing device;
at least one processing device; and
at least one computer-readable data storage device storing software instructions that, when executed by the at least one processing device, cause the at least one processing device to:
capture a sequence of images viewed from the optical viewing device;
determine an image quality score for each image in the sequence of images;
select a subset of images from the sequence of images based on the image quality score determined for each image in the sequence of images;
display the subset of images;
receive a selection of one or more images from the subset of images;
store the one or more images selected from the subset of images;
display a comparison of a baseline image to the one or more images selected from the subset of images; and
adjust at least one of an alignment, a rotation, and a scale of the one or more images selected from the subset of images to match an alignment, a rotation, and a scale of the baseline image.

19. An imaging device for capturing images viewed from an optical viewing device, the imaging device comprising:

a housing having a bracket for attaching the imaging device to the optical viewing device;

at least one processing device; and at least one computer-readable data storage device storing software instructions that, when executed by the at least one processing device, cause the at least one processing device to:

capture a sequence of images viewed from the optical viewing device;

synchronize the sequence of images to a stimulus applied by the optical viewing device;

determine an image quality score for each image in the sequence of images;

select a subset of images from the sequence of images based on the image quality score determined for each image in the sequence of images;

display the subset of images;

receive a selection of one or more images from the subset of images; and store the one or more images selected from the subset of images.

\* \* \* \* \*